June 14, 1938.  H. MESSENGER  2,120,293
CHANGE SPEED DRIVE TRANSMISSION
Filed Jan. 23, 1937   2 Sheets-Sheet 2
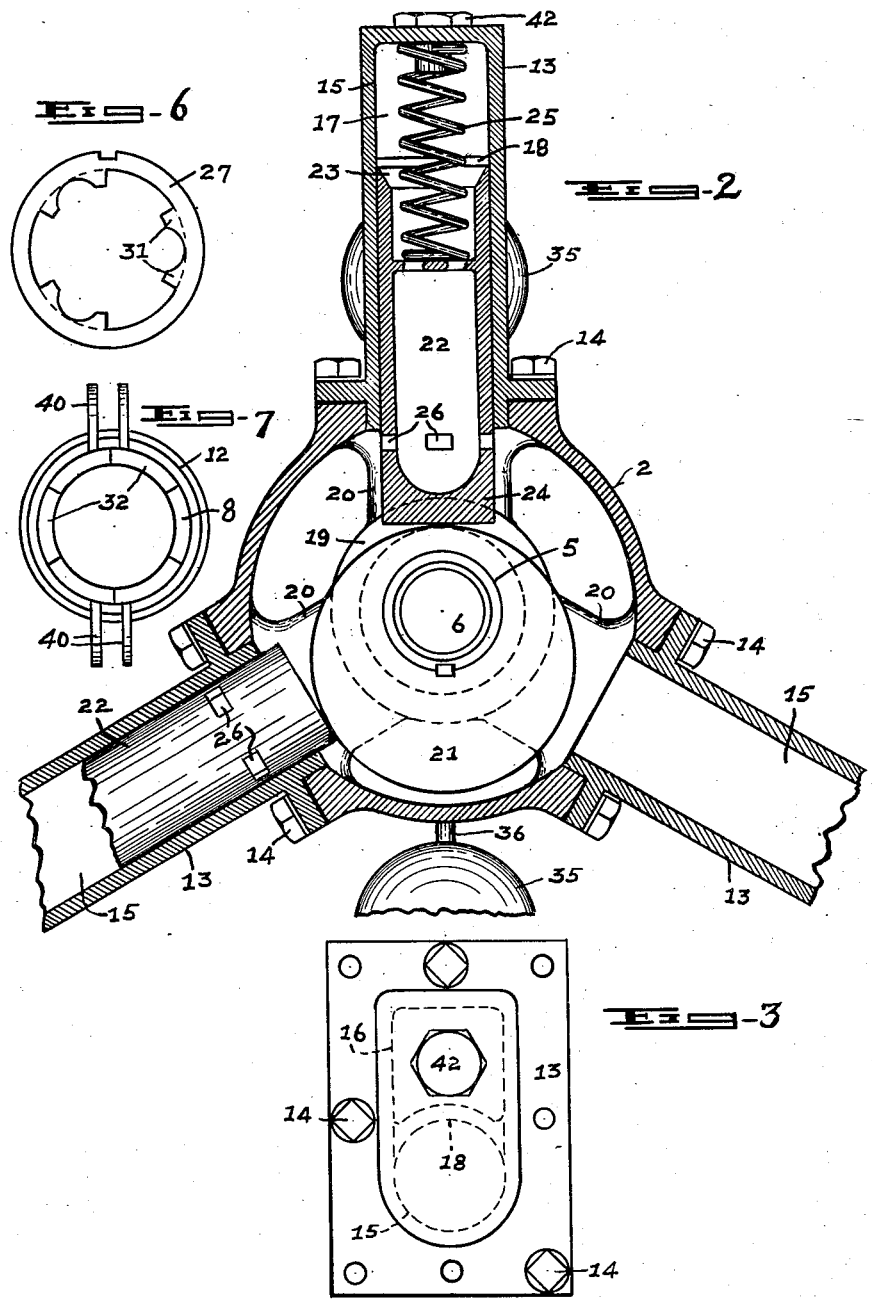
INVENTOR
Herbert Messenger
By Jas R Snyder
Attorney Patented June 14, 1938

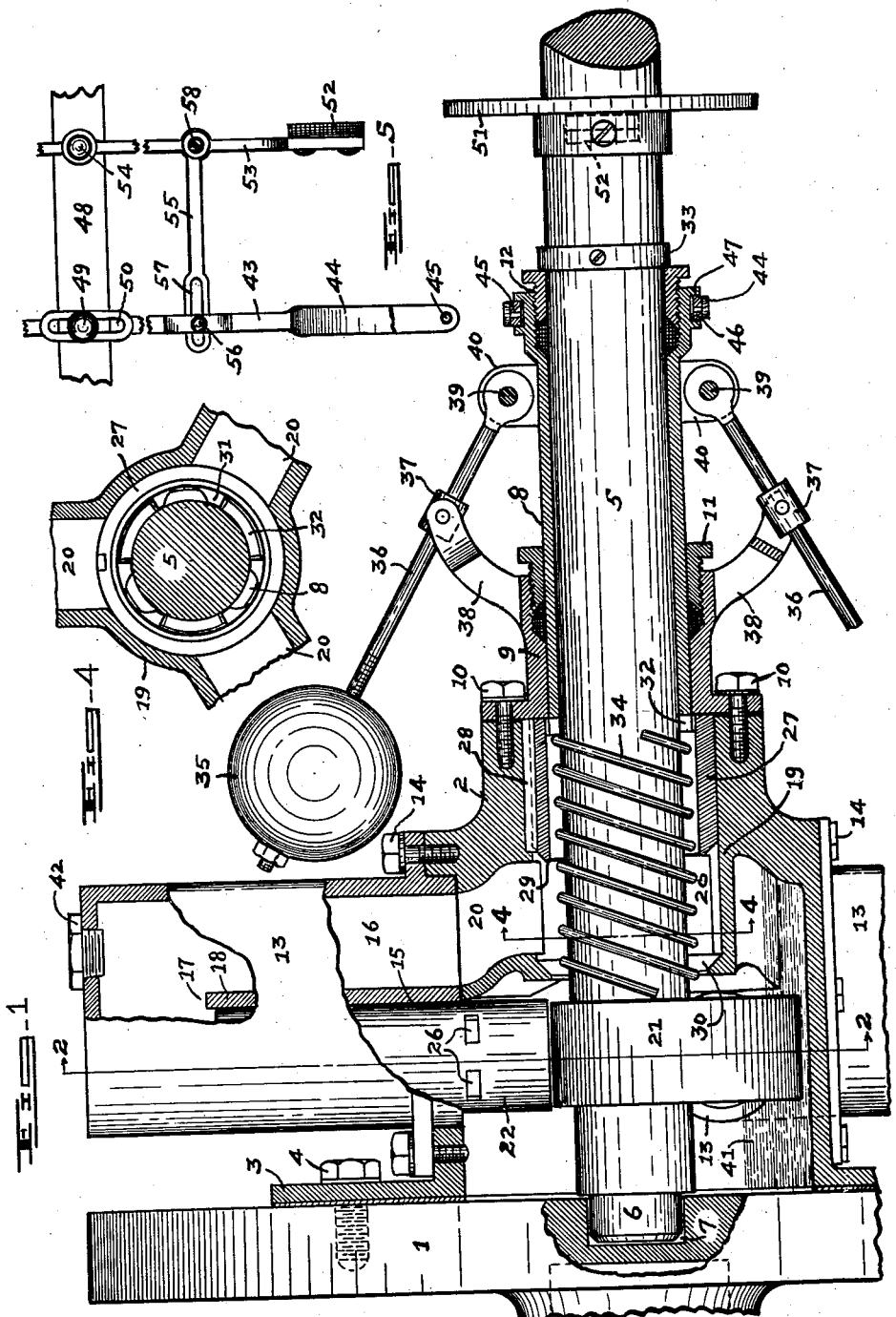

2,120,293

UNITED STATES PATENT OFFICE 2,120,293

CHANGE-SPEED DRIVE TRANSMISSION

Herbert Messenger, Claysville, Pa.

Application January 23, 1937, Serial No. 122,080

1 Claim. (Cl. 192—60)

This invention relates to a change-speed drive transmission primarily intended for use in connection with the drive mechanism of a motor vehicle, but it is obvious that the device may be employed in any other type of apparatus or for any other purposes wherein it is found to be applicable.

Important objects and advantages of the invention are to provide a drive transmission of the character described, which is simple in its construction and arrangement, which is fluid controlled and automatic in its operation, which is compact, durable and efficient in its use, positive in its action, conveniently employed, and comparatively inexpensive to manufacture.

With the foregoing and other objects in view which will appear as the description proceeds, the invention resides in the novel construction, combination and arrangement of parts herein specifically described and illustrated in the accompanying drawings, but it is to be understood that the latter are merely illustrative of an embodiment of the invention, and that the actual needs of practice and manufacture may require certain mechanical variations from the embodiment shown. It is, therefore, not intended to limit the invention to the disclosure thereof herein illustrated, but rather to define such limitations to the scope of the claim hereunto appended.

In the drawings wherein like numerals of reference designate corresponding parts throughout the several views:

Figure 1 is a side elevational view, partly in section and with parts broken away, of a drive transmission constructed in accordance with the invention.

Figure 2 is a sectional view on line 2—2, Figure 1.

Figure 3 is a top plan view of the cylinder casing.

Figure 4 is a sectional view of the valve barrel taken on line 4—4, Figure 1, with associated parts.

Figure 5 is a fragmentary top plan view of controlling elements embodied in the present invention.

Figure 6 is a rear end view of the closure valve, and Figure 7 is a front end view of the shaft sleeve.

Referring in detail to the drawings, 1 denotes the fly-wheel of an internal combustion engine or other apparatus providing the prime source of power. A transmission housing 2, having an outwardly disposed annular flange 3 at its open front end, is rigidly secured to the rear side of the fly-wheel by means of bolts 4, which extend through the flange 3 and engage the fly-wheel. The fly-wheel virtually constitutes the front wall of the housing, which is positioned concentrically of the axis of the fly-wheel and has a leak-proof connection with the latter.

A drive shaft 5 extends longitudinally through the transmission housing 2, and is longitudinally aligned with the axis of the fly-wheel 1. The drive shaft has a reduced front end 6, which is revolubly engaged in a pocket 7, formed in the diametric center of the fly-wheel, for stabilizing the operation of said drive shaft.

An elongated shaft sleeve 8 is mounted on the drive shaft 5. The drive shaft is revoluble in the shaft sleeve, and the latter is longitudinally shiftable on the former. The shaft sleeve is also longitudinally shiftable in and extends through an end bearing 9, which is fixed, by bolts 10, to the rear end of the transmission housing 2. The rear end of the bearing 9 is provided with a suitable stuffing-box 11 to prevent leakage between the rear end of the said bearing and the shaft sleeve. The rear end of the shaft sleeve is likewise provided with a suitable stuffing-box 12 to prevent leakage between the rear end of the shaft sleeve and the drive shaft.

It will here be noted that, the connection of the transmission housing 2 with the fly-wheel 1 and the engagement of the shaft sleeve 8 with the drive shaft 5, in the manner stated, is such as to allow the free rotation of said transmission housing and shaft sleeve with the fly-wheel without imparting rotation to the drive shaft.

A plurality of radially disposed cylinder casings 13 are secured to the transmission housing 2 by means of bolts 14. Each of the cylinder casings is provided with a cylinder bore 15 and with a fluid passage 16. The cylinder bore 15 and fluid passage 16 extend radially and parallel to each other, with the latter disposed rearwardly of the former, and have closed outer ends and open inner ends. The bore 15 and passage 16 communicate with each other at their outer ends through an opening 17 provided in the interposed cylinder wall 18.

A cylindrical valve barrel 19 is formed integral with the interior of the transmission housing 2, surrounds the drive shaft 5, and has its front end spaced from the front end of the transmission housing. The valve barrel is provided with a plurality of fluid passage extensions 20, each of which is disposed radially and provides a separate, individual communication between the inner open end of respective fluid passages 16 in the cylinder casings 13 and the interior of the valve barrel and transmission housing.

A circular cam 21 is fixed eccentrically on the drive shaft 5 within the transmission housing 2 and forwardly of the valve barrel 19. A tubular plunger 22 is slidably mounted for radial reciprocal movement in each of the cylinder bores 15 in the cylinder casings 13. Each of the plungers 22 has an open outer end 23 and a closed inner end 24, which latter rides on the periphery of the circular cam 21. A coil spring 25 is seated in the open outer end of each of the plungers and abuts against the closed outer end of respective cylinder bores. It will be evident that, during the rotation of the transmission housing 2 when the drive shaft is not rotating, the travel of the plungers on the periphery of the eccentrically mounted cam in conjunction with action of the springs 25, will impart radial reciprocal movement to the plungers 22 in respective cylinder bores 15.

Each of the plungers 22 is provided with a plurality of ports 26, which are disposed adjacent to but spaced from the closed inner end 24 thereof. The positions of the ports 26 in the plungers 22 are such that the same will clear the open inner end of the cylinder bore 15 only when the plunger is projecting from the latter to its greatest extent, during the reciprocal movements of said plunger. The ports 26 provide intermittent communication between the interior of the transmission housing 2 and the interior of the tubular plunger for the purpose to be described.

A cylindrical closure valve 27 is mounted in the valve barrel 19 and surrounds the drive shaft 5. The closure valve is longitudinally shiftable in the valve barrel but is secured against rotation in the latter by means of a key 28 interengaged in said closure valve and said cylindrical barrel. The closure valve is open at both ends thereof and the front end is exteriorly beveled, as indicated at 29, and adapted to engage in the correspondingly beveled valve seat 30 formed in the forward end of the valve barrel. The rear end of the closure valve is provided with a plurality of spaced, inwardly disposed lugs 31, which engage the projections 32 provided at the front end of the shaft sleeve 8 to prevent the independent rotation of the latter on the drive shaft 5.

When the closure valve 27 is in its open rearward position, as shown in Figure 1, the passage extensions 20 are open to communicate with the interior of the valve barrel 19 and the transmission housing 2, and the rear end thereof abuts against the forward end of the end bearing 9 and is always engaged by the projections 32 on the shaft sleeve 8. The rearward longitudinal movement of the latter on the drive shaft 5 is limited by a stop ring 33 adjustably fixed on said drive shaft.

A coil spring 34 is mounted on the drive shaft 5 and one thereof abuts against the rear face of the cam 21. The other end of the coil spring 34 extends into the closure valve 27 and abuts against the inwardly disposed lugs 31 carried by the latter. The action of the spring 34 normally forces the closure valve to the open position against the end bearing 9 and maintains the engagement of the lugs 31 with the projections 32 at the front end of the shaft sleeve 8.

When the closure valve 27 is in its closed forward position in the valve barrel 19, the beveled forward end 29 thereof will engage in the valve seat 30 at the forward end of said valve barrel, and communication between each of the passage extensions 20 and the interior of the valve barrel is completely shut off.

The closure valve 27 is shifted to the closed position by the forward longitudinal movement of the shaft sleeve 8 on the drive shaft 5. The forward movement of the shaft sleeve on the drive shaft is effected by an automatically operable governor attachment comprising a plurality of weight members 35, each of which is preferably adjustably secured at the free end of a supporting arm 36. The latter extends slidably through a sleeve 37 pivotally supported in the outer end of a bracket 38 fixed to the end bearing 9, and has its other end pivotally connected, as at 39, in a pair of ears 40 fixed to the shaft sleeve 8 adjacent to the rear end of the latter.

The operation of such governor attachment is well known, and it embodies the usual principle whereby the weight members 35 are actuated by centrifugal action to fly away from or towards their axis of revolution according as their speed is increased or diminished, and by the connection of the weight members, through the supporting arms 36, with the shaft sleeve 8, such motion is utilized to shift the latter longitudinally forward on the drive shaft 5 to shift the closure valve 27 forwardly to the closed position in the valve barrel 19 and against the action of the spring 34. The action of the latter will return the closure valve and shaft sleeve to their rearward positions when the diminished speed of the governor attachment permits such return movement.

The transmission housing 2 and associated cylinder casings 13 are filled with any suitable operating liquid or fluid 41, preferably with oil capable of maintaining its uniform and consistent fluidity under any temperature variations and conditions.

One of the cylinder casings 15, or the transmission housing 2, is provided with an aperture and plug 42, by which the fluid 41 may be placed in the transmission housing and cylinder casings or drained therefrom.

As the transmission housing 2 is bolted against the rear side of the fly-wheel 1, the rotation of the latter will, of course, impart like rotation to the former. When the fly-wheel and transmission housing are rotating at idling speed, or with insufficient speed to actuate the weight members 35 of the governor attachment, the drive shaft 5 will not rotate but will remain motionless while the shaft sleeve 8 and transmission housing will revolve with the fly-wheel on the motionless drive shaft. While the device is rotating at such idling speed, the fluid 41 will circulate freely without retardation through the interior of the transmission housing, through the cylinder bores 15 and fluid passages 16, and through the passage extensions 20 and the valve barrel 19, and through the ports 26 and plungers 22. The ports in the plungers will allow the escape of the fluid through said plungers whereby the latter will reciprocate freely in respective cylinder bores 15 while the closure valve 27 is in the open position.

When the rotating speed of the device is sufficient to actuate the governor attachment, the latter in turn will force the shaft sleeve 8 forwardly on the drive shaft 5. As the forward end of the shaft sleeve engages the rear end of the closure valve 27, the forward movement of said shaft sleeve will push the closure valve forwardly in the valve barrel 19, thereby gradually closing the communications between the fluid passages 20 and the valve barrel and housing 2. When the closure valve is shifting to the closing position, the circulation of the fluid 41 through the cylinder casings 13 will be retarded, and such retardation of the fluid gradually increases as the closure valve is shifting to the closed position. The retardation of the fluid through the cylinder casings 13 will cause the plungers 22 to exert a pressure engagement against the cam 21, whereby said cam and shaft 5 fixed to the latter, will be held by the plungers 22 to rotate with the transmission housing 2. It will be evident that, only when the device is rotating at sufficient speed to fully extend the weight members 35 of the governor attachment, will the closure valve 27 be entirely closed. When the closure valve is entirely closed, only one of the plungers at any one time will be actively engaged in holding the cam to cause the rotation of the drive shaft with the transmission housing. The holding plunger will be held in the engaging position against the cam by the fluid 41 confined within the associated cylinder casing 13.

When the closure valve 27 is gradually shifting to the closing position, the increasing retardation of the fluid circulation in the cylinder casings 13, while still allowing some slippage of the plungers 22 on the cam 21, will gradually carry the latter along with said plungers, thereby gradually increasing the rotation of the drive shaft 5 in a manner not unlike the low and intermediate speeds of the conventional type of transmission now embodied in the drive mechanism of motor vehicles.

When the rotating speed of the transmission housing 2 diminishes for any reason, the automatic action of the governor attachment will permit the spring 34 to gradually force the closure valve in the opening direction in the valve barrel 19, thereby diminishing the retardation of the operating fluid 41 and allowing the slippage of the plungers 22 on the cam 21 to differentiate the speed of the transmission housing 2 relatively to the revolutions effected to the drive shaft 5 to provide the necessary driving power.

A manually operated control element is provided for shifting the closure valve 27 to, and holding the latter, in the open position. The control element comprises an actuating bar 43 provided with a yoke 44, which has a pivoted pin connection 45 with a slip collar 46 circumferentially shiftable in a groove 47 provided at the rear end of the shaft sleeve 8.

The actuating bar 43 has a shiftable pivoted connection with a suitable support 48, by means of a pivoting pin 49 engaged in an oblong slot 50 formed in the said actuating bar. This shiftable connection compensates for the variation in the distance between the pivotal points of the actuating bar caused and necessitated by the longitudinal movement of the shaft sleeve 8 on the drive shaft 5.

The drive shaft 5 is provided with a fixed brake disk 51, which is adapted to be frictionally engaged by a brake block 52 carried by a brake bar 53. The latter has a pivotal connection 54 with the support 48, and is operable to force the brake block 52 against the brake disk 51 to retard the rotation of the drive shaft 5, when the latter is revolving by momentum or by the frictional engagement of the shaft sleeve 8 therewith, or when for any reason it is desired to hold said drive shaft against rotation.

A connecting link 55 joins the actuating bar 43 with the brake bar 53, having a shiftable pivoted connection 56 with the actuating bar 43 through an oblong compensating slot 57 formed in one end of said link. The other end of the latter has a pivotal connection 58 with the brake bar 53. The connecting link allows the operation of the actuating bar 43 independently of the operation of the brake bar 53 due to the provision of the compensating slot 57, but will operate the actuating bar simultaneously with the operation of the brake bar, as it will be apparent that the closure valve 27 should be shifted to the open position prior to attempting to retard the rotation of the drive shaft 5 by the operation of the braking mechanism.

My improved change-speed drive transmission does not provide for the reverse rotation of the shaft 5, as such reverse mechanism forms no essential part of the present disclosure, but it is evident that some suitable reverse mechanism may be successfully embodied in the improved transmission structure without departing from the principle of the invention.

The interior of the transmission housing 2 serves as a storage reservoir for the operating fluid 41. Even if the transmission housing and the associated cylinder casings 13 are not filled to capacity with the operating fluid, the centrifugal action, caused by the rotation of the device, will tend to throw the fluid into the radially disposed cylinder casings. The engagement of the plungers 22 on the cam 21 is effected solely by the action of the former against the fluid confined within the respective cylinder casings by the closure of the closure valve 27 in the valve barrel 19.

It will be noted that the ports 26 in the plungers 22 are exposed and clear the cylinder bores 15 only when said plungers are at the innermost positions of their reciprocal strokes. The ports not only provide entrances and exits for the operating fluid, but also serve as air vents promoting the free circulation of the fluid within the cylinder casings 13 to prevent retardation of the idling rotation of the device when the closure valve 27 is in the open inoperative position in the valve barrel 19. The holding action of the plungers, against the operating fluid retarded or confined within the cylinder casings, is effected only after the ports 26 have entered the inner ends of the cylinder bores 15 during the outward reciprocal strokes of the said plungers.

The present invention provides a most durable and efficient device of its kind, which is entirely automatic in its operation, and which may be successfully employed to operate a drive shaft at any speed to provide the power necessary to effect the start, propulsion, or operation of the apparatus it is intended to operate.

What I claim is:

In a fluid controlled drive transmission for a power apparatus including a revoluble element, the combination of a housing for the fluid secured to said element, a driven shaft extending into said housing, a plurality of radially disposed casings fixed to said housing, each of said casings being provided with a cylindrical bore and with a fluid passage communicating with outer of the latter, a circular cam eccentrically fixed on said shaft and being disposed in said housing, a plunger slidably mounted for reciprocal movement in each of said bores and having its inner end seated on the periphery of said cam, a valve barrel fixed in said housing and surrounding said shaft, said barrel having passage extensions communicating with the inner ends of respective fluid passages, a closure valve longitudinally shiftable in said barrel and surrounding said shaft, interengaging means for causing said valve to rotate with said barrel, a sleeve revolubly mounted on said shaft and being longitudinally shiftable on the latter, interengaging means at the adjacent ends of said valve and said sleeve for causing the latter to rotate with said valve, a bearing for said sleeve removably secured to the rear end of said housing, and automatically operating means controlled by centrifugal action supported by said bearing and having pivotal connections with said sleeve for operating the latter to shift said valve in said barrel to close the communications of said passage extensions with said housing.

HERBERT MESSENGER.